US011753796B1

(12) United States Patent
Long

(10) Patent No.: US 11,753,796 B1
(45) Date of Patent: Sep. 12, 2023

(54) SWING DRIVE WITH OIL MANAGEMENT SYSTEM AND WORK VEHICLE WITH SAME

(71) Applicant: Deere & Company, Moline, IL (US)

(72) Inventor: Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/056,324

(22) Filed: Nov. 17, 2022

(51) Int. Cl.
*E02F 9/12* (2006.01)
*F16H 57/04* (2010.01)

(52) U.S. Cl.
CPC .............. *E02F 9/123* (2013.01); *E02F 9/126* (2013.01); *F16H 57/0427* (2013.01); *F16H 57/0479* (2013.01)

(58) Field of Classification Search
CPC .. F16H 57/0427; F16H 57/0479; E02F 9/123; E02F 9/126
USPC .......................................................... 475/159
See application file for complete search history.

(56) References Cited

U.S. PATENT DOCUMENTS

| 3,811,577 | A | * | 5/1974 | Yancey | .................... | E02F 9/121 |
| | | | | | | 74/467 |
| 7,545,060 | B2 | | 6/2009 | Ward | | |
| 7,845,470 | B2 | * | 12/2010 | Smolong | .................. | F16N 7/385 |
| | | | | | | 184/6.12 |
| 10,024,341 | B2 | | 7/2018 | Zhang et al. | | |
| 2016/0363201 | A1 | * | 12/2016 | McNally | .............. | B60K 17/348 |

FOREIGN PATENT DOCUMENTS

| EP | 0985262 A1 | 3/2000 |
| JP | 2006325369 A | 11/2006 |

OTHER PUBLICATIONS

Deere & Company, Utility U.S. Appl. No. 17/663,083, filed May 12, 2022. (31 pages).

* cited by examiner

*Primary Examiner* — Colby M Hansen
(74) *Attorney, Agent, or Firm* — KLINTWORTH & ROZENBLAT IP LLP

(57) ABSTRACT

A swing drive for rotating a component of a work vehicle. The swing drive has an electric machine rotating an output shaft about a drive axis and having a planetary set disposed beneath the electric machine. The planetary set has a carrier with pinion shafts having oil passageways therethrough. A splash plate is disposed axially between the electric machine and the planetary set to direct lubricating oil from a face of the electric machine to the oil passageways of the pinion shafts and to direct lubricating oil from the face of the electric machine around the oil passageways. A drive gear is driven to rotate about the drive axis by the electric motor via the double planetary set.

20 Claims, 13 Drawing Sheets

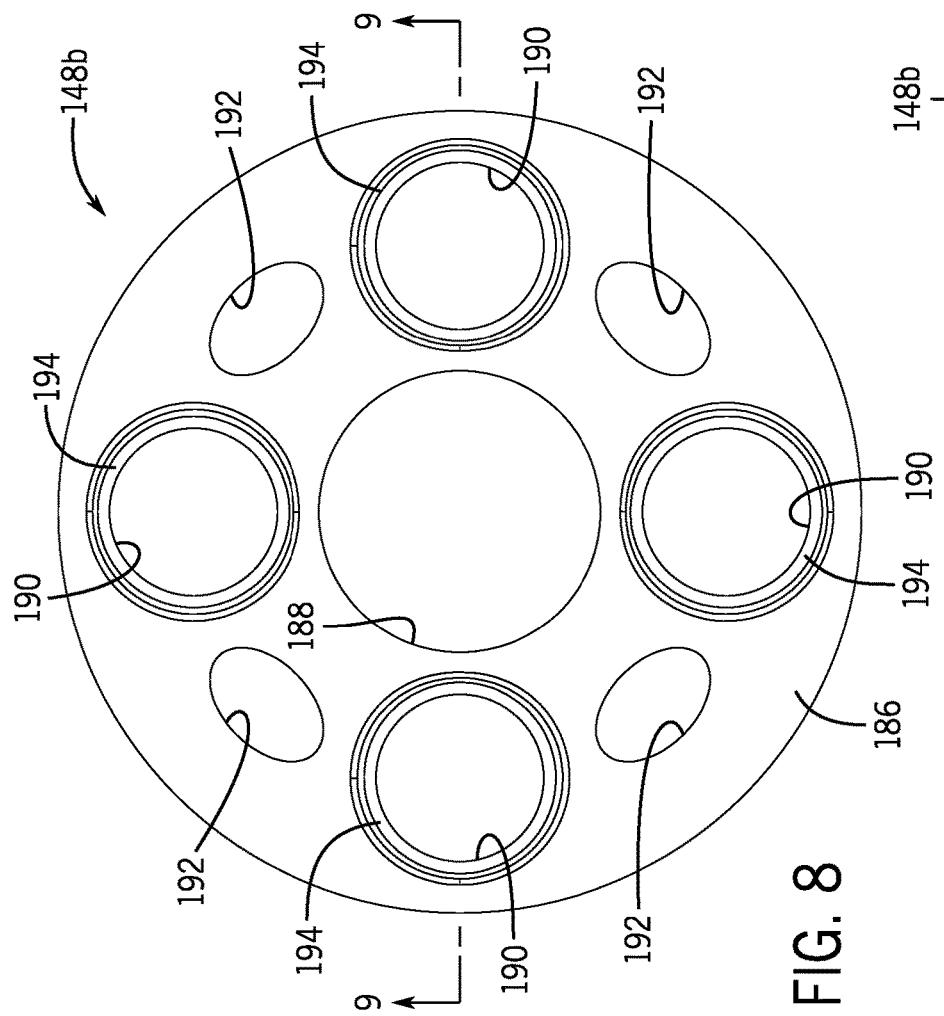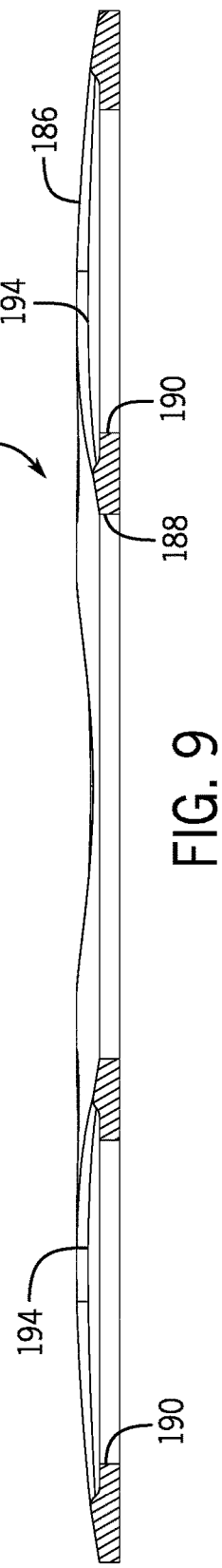

SWING DRIVE WITH OIL MANAGEMENT SYSTEM AND WORK VEHICLE WITH SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to swing drives for full-circle rotation of work vehicle components (e.g., work implements and operator cabins).

BACKGROUND OF THE DISCLOSURE

Work vehicles, such as those used for various building, construction, quarrying, roadbuilding, site preparation, and tree harvesting operations, may have features or components that rotate continuously in full circles (i.e., 360 degrees and greater). An excavator, for example, may have an undercarriage on ground engaging tracks that mounts a swing drive to rotate a main frame supporting an operator cab and boom relative to the undercarriage. In other work vehicles, swing drives may be employed to rotate grapples or other work implements.

SUMMARY OF THE DISCLOSURE

The disclosure provides a work vehicle and further provides a swing drive for a rotating a component of a work vehicle. The swing drive has an electric machine and an oil management system.

The swing drive includes an electric machine rotating an output shaft about a drive axis, a planetary set disposed beneath the electric machine coaxial with the drive axis and having a carrier with pinion shafts having oil passageways therethrough, a splash plate disposed axially between the electric machine and the planetary set, and a drive gear driven about the drive axis by the electric machine via the planetary set. The splash plate is configured to direct lubricating oil from a face of the electric machine to the oil passageways of the pinion shafts in order to lubricate an area of the planetary set and to direct lubricating oil from the face of the electric machine away from the oil passageways to lubricate another area the planetary set; and In some embodiments, each oil passageway includes a first passageway which extends from a top of the associated pinion shaft to a bottom of the associated pinion shaft, and a second passageway extending from the first passageway to a side of the associated pinion shaft. In some embodiments, each first passageway defines a catch cup and a lower passageway, the catch cup having an enlarged diameter relative to the lower passageway.

In some embodiments, a second planetary set disposed beneath the first carrier of the first planetary set. The second planetary set is coaxial with the drive axis and has a second carrier with second pinion shafts having second oil passageways therethrough, and a second splash plate disposed axially below the first carrier. The second splash plate is configured to direct lubricating oil to the second oil passageways and to direct lubricating oil around the second oil passageways. The the drive gear is further driven about the drive axis via the second planetary set. In some embodiments, each oil passageway includes a first passageway which extends from a top of the associated pinion shaft to a bottom of the associated pinion shaft, and a second passageway extending from the first passageway to a side of the associated pinion shaft. In some embodiments, each first passageway defines a catch cup and a lower passageway, the catch cup having an enlarged diameter relative to the lower passageway. In some embodiments, each oil passageway of the first carrier includes a first passageway which extends from a top of the associated pinion shaft to a bottom of the associated pinion shaft, and a second passageway extending from the first passageway to a side of the associated pinion shaft, and each oil passageway of the second carrier includes a first passageway which extends from a top of the associated pinion shaft to a second passageway which extends to a side of the associated pinion shaft. Each first passageway of the first carrier may define a catch cup and a lower passageway, the catch cup having an enlarged diameter relative to the lower passageway.

Power is transmitted from the output shaft of the electric machine to the drive gear via input to a first sun gear of the first planetary set, output from the first carrier to a second sun gear of the second planetary set, and output from a second carrier of the second planetary set to the drive gear.

A drive housing is provided in which the planetary set is disposed. The drive housing including an end plate through which the drive gear extends. A first bearing is provided on the end plate and supports the carrier for rotation relative to the end plate of the drive housing, and the first bearing receives lubricating oil from the planetary set. A second bearing is disposed to an exterior side of the end plate opposite the first bearing. The second bearing receives lubricating oil from the first bearing.

The splash plate may be dome shaped with an arcuate cross-section along all radial lines thereof.

The splash plate includes at least one aperture therethrough which directs lubricating oil from the face of the electric machine around the oil passageways.

A separator may be disposed within an annular splined shaft meshing with a sun gear of the planetary set and including a splash surface configured to direct a portion of lubricating oil passing around the output shaft of the electric machine to the planetary set and a metering passageway directing a portion of the lubricating oil passing around the output shaft to the drive gear.

The details of one or more embodiments are set forth in the accompanying drawings and the description below. Other features and advantages will become apparent from the description, the drawings, and the claims.

BRIEF DESCRIPTION OF THE DRAWINGS

FIG. 8 is a top plan view of a splash plate of the swing drive;

FIG. 9 is a cross-sectional view of the splash plate of FIG. 8;

Like reference symbols in the various drawings indicate like elements.

DETAILED DESCRIPTION

Figure 1:
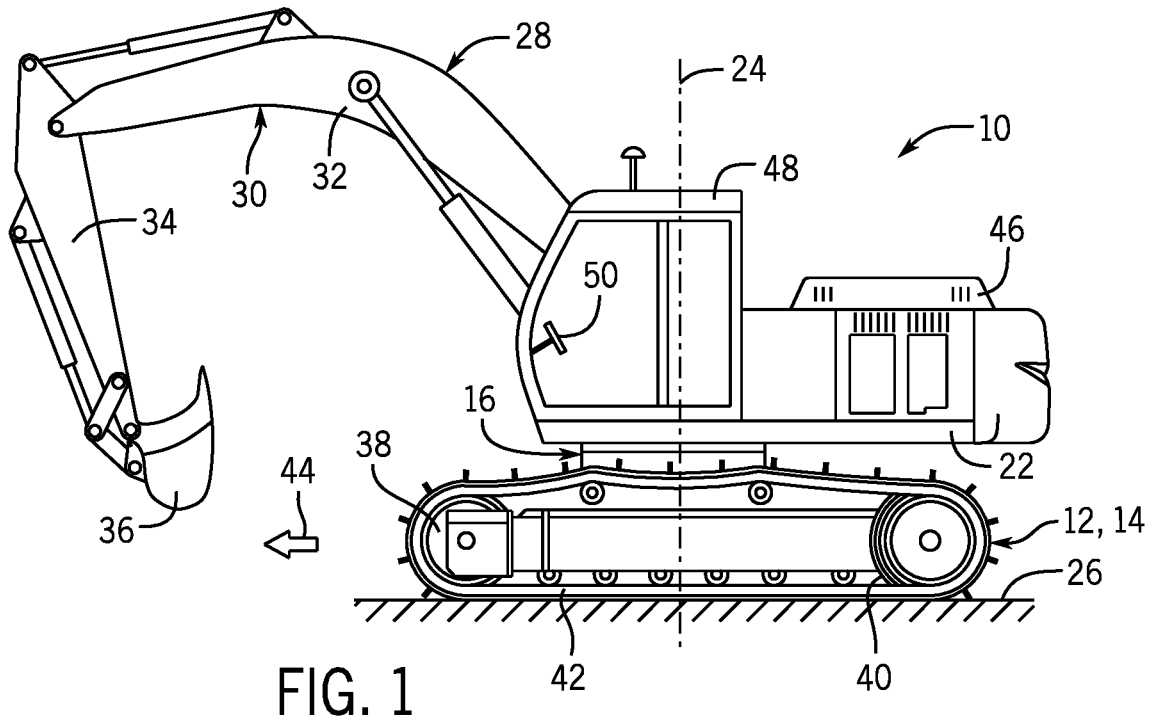
FIG. 1 is a side view of an example work vehicle in the form of an excavator in accordance with this disclosure.

The following describes one or more example embodiments of the disclosed hitch assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

Generally, a swing drive is used to couple two components of a work vehicle while allowing for 360 degrees or more of rotation. The work vehicle may be an excavator and the swing drive couples an undercarriage of the excavator to a main frame of the excavator. The swing drive is coupled to a post of the undercarriage. The main frame is pivotable about a pivot axis relative to the undercarriage, and may rotate three-hundred sixty degrees via the coupling provided by the swing drive and the post. The main frame supports a work implement which may include a boom assembly having an operable working tool that is used for excavating. The swing drive includes an electric machine, a gear train coupled to the electric machine, a mount attaching a lower end of the electric machine to an upper end of the gear train, a swing mount housing assembly attached to a lower end of the gear train, and a drive gear coupled to the swing mount housing assembly and the gear train. The gear train rotates the drive gear when the gear train is actuated by the electric machine. The gear train includes a plurality of bearings which need lubrication in order to optimally function. In addition, the drive gear has bearings which need lubrication in order to optimally function. The electric machine uses lubricating oil for operation and the lubricating oil is gravity fed into the gear train. The gear train provides improved splash plates and carriers which serve to manage the flow of lubricating oil to optimize the flow of lubricating oil onto the bearings. The splash plates are generally dome shaped and allow for lubricating oil to flow therethrough. The carriers have passageways which route the lubricating oil to the bearings.

The following describes one or more example implementations of the disclosed lubricating oil management systems for an electric swing drive for a work vehicle, as shown in the accompanying figures of the drawings described briefly above.

Figure 2:
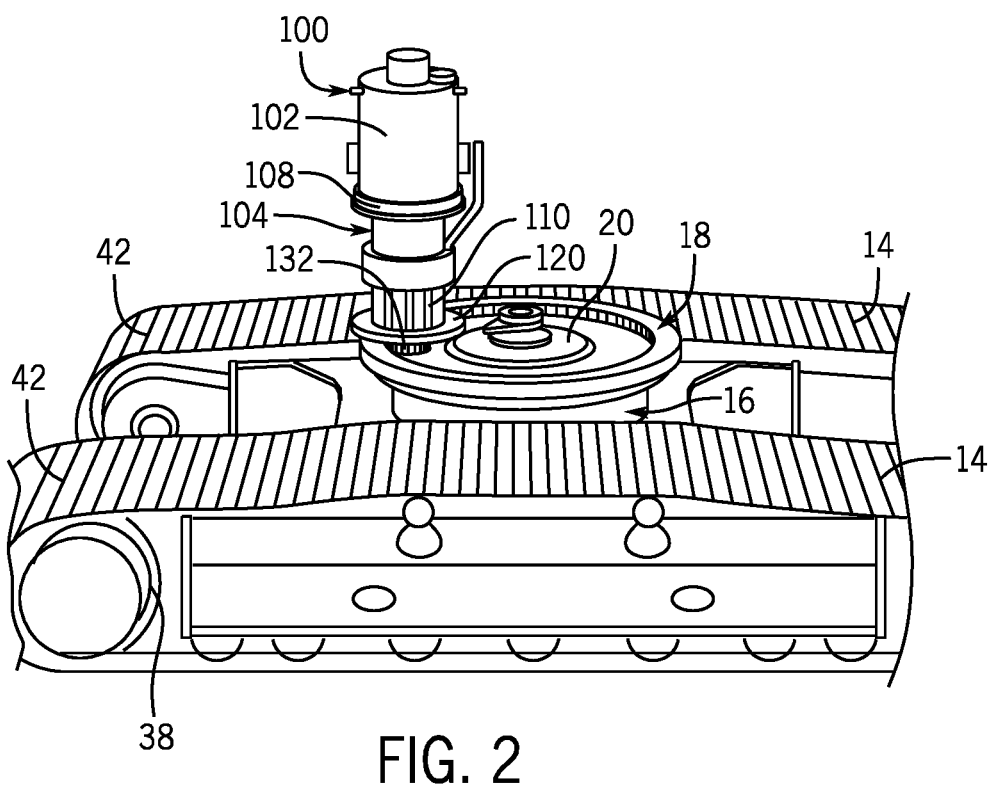
FIG. 2 is a partial isometric view of an undercarriage and swing drive of the work vehicle.

FIGS. 1 and 2 in a particular embodiment as disclosed herein shows a representative self-propelled work vehicle in the form of, for example, a tracked excavator machine 10. The work vehicle 10 includes an undercarriage 12 including first and second ground engaging units 14, commonly referred to as crawler tracks, including first and second travel motors (not shown) for driving the first and second ground engaging units 14, respectively. The undercarriage 12 is generally H-shaped and supports the first and second ground engaging units 14 along its edges and includes a post 16 having an outer ring gear 18 having a plurality of teeth on its inner circumference and an inner cylindrical mount 20 centrally mounted in the ring gear 18. A swing drive 100 is connected to the ring gear 18 and the inner mount 20 and to a main frame 22. The main frame 22 is pivotable about a pivot axis 24 relative to the undercarriage 12, and may rotate three-hundred sixty degrees. The pivot axis 24 is substantially vertical when a ground surface 26 engaged by the ground engaging units 14 is substantially horizontal. The swing drive 100 is configured to pivot the main frame 22 on the post 16 about the pivot axis 24 relative to the undercarriage 12. The teeth of the ring gear 18 mesh with the swing drive 100 and the inner mount 20 engages with the swing drive 100.

The main frame 22 supports a work implement 28. As shown, the work implement 28 includes a boom assembly 30 with a boom 32, an arm 34 pivotally connected to the boom 32, and a working tool 36. The term "implement" may be used herein to describe the boom assembly 30 (or equivalent thereof) collectively, or individual elements of the boom assembly 30 or equivalent thereof. The boom 32 is pivotally attached to the main frame 22 to pivot about a generally horizontal axis relative to the main frame 22 and may be actuated by hydraulic actuators. The working tool 36 in this embodiment is an excavator shovel (or bucket) which is pivotally connected to the arm 34. The boom 32 extends from the main frame 22 along a working direction of the boom 32.

In the embodiment of FIG. 1, the first and second ground engaging units 14 are tracked ground engaging units, although various alternative embodiments of a work vehicle 10 are contemplated wherein the ground engaging units 14 may be wheeled ground engaging units. Each tracked ground engaging unit 14 includes an idler 38, a drive sprocket 40, and a track chain 42 extending around the idler 38 and the drive sprocket 40. A travel motor of each tracked ground engaging unit 14 drives its respective drive sprocket 40. Each tracked ground engaging unit 14 is represented as having a forward traveling direction 44 defined from the drive sprocket 40 toward the idler 38. The forward traveling direction 44 of the tracked ground engaging units 14 also defines a forward traveling direction 44 of the undercarriage 12 and thus of the work vehicle 10. In some applications, including uphill travel, the orientation of the undercarriage 12 may be reversed such that a traveling direction of the work vehicle 10 is defined from the idler 38 toward its respective drive sprocket 40, whereas the work implement(s) 28 is still positioned ahead of the undercarriage 12 in the traveling direction.

An engine 46 for powering the work vehicle 10 is mounted on the main frame 22. The engine 46 may be an internal combustion engine. The engine 46 may drive a hydraulic pump to provide hydraulic power to the various operating systems of the work vehicle 10.

An operator's cab 48 may be located on the main frame 22. The operator's cab and the boom assembly 30 may both be mounted on the main frame 22 so that the operator's cab 48 faces in the working direction 44 of the boom assembly 30. A control station 50 may be located in the operator's cab 48. The various functions of the work vehicle 10 may be controlled in part by the appropriate handling of various control devices by an operator occupying the cab 48.

Figure 3:
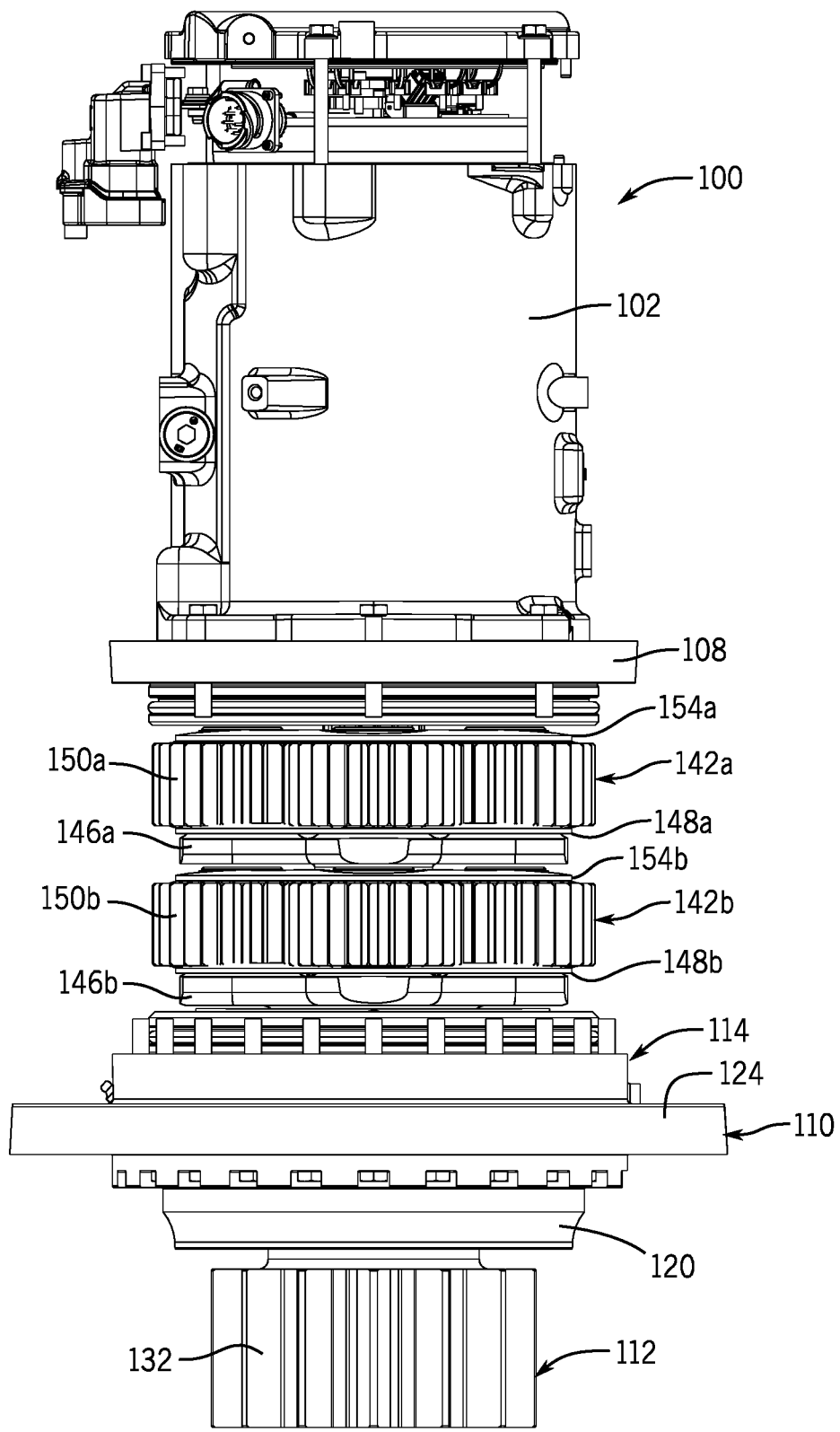
FIG. 3 is a side elevation view of the swing drive, with a ring gear removed to show planetary sets.
Figure 4:
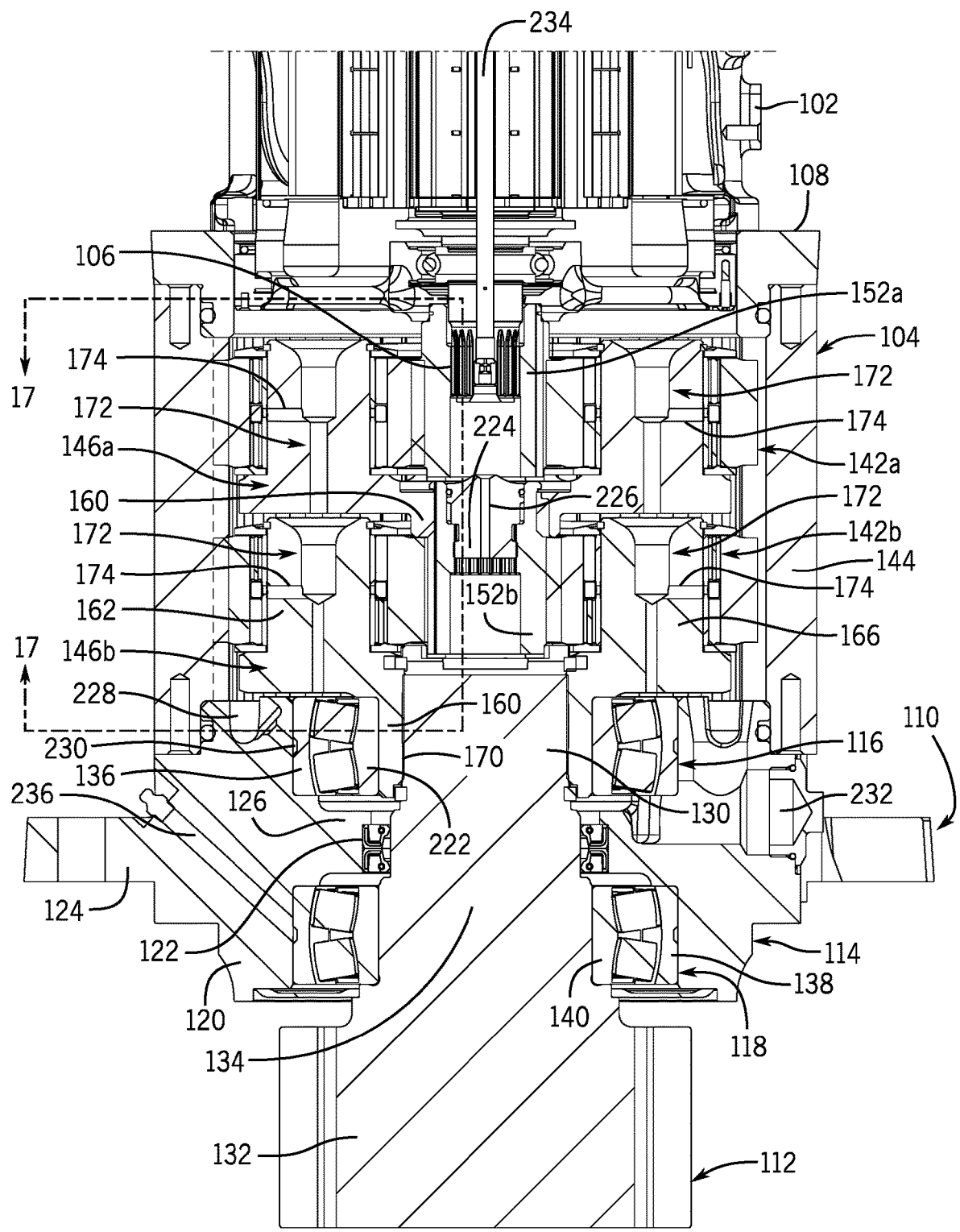
FIG. 4 is a partial cross-sectional view of the swing drive.

As shown in FIGS. 2-4, the swing drive 100 includes an electric machine 102, a gear train 104 coupled to a splined output shaft 106 of the electric machine 102, a mount 108 attaching a lower end of the electric machine 102 to an upper end of the gear train 104, a swing mount housing assembly 110 attached to a lower end of the gear train 104, and a drive gear 112 coupled to the swing mount housing assembly and the gear train 104. The gear train 104 rotates the drive gear 112 when the gear train 104 is actuated by the electric machine 102. A drive axis is defined through a center of the drive gear 112.

The swing mount housing assembly 110 includes an end plate 114 which houses a first upper bearing 116 and a second lower bearing 118. The end plate 114 has an outer cylindrical wall 120 which defines a passageway 122 extending from an upper end thereof to a lower end thereof, and a circular flange 124 that extends outward from the outer surface of the outer wall 120. An internal wall 126 extending from the inner surface of the outer wall 120 separates the passageway 122 into an upper passageway portion which houses the first upper bearing 116, a lower passageway portion which houses the second lower bearing 118, and a central passageway portion having a diameter which is less than the diameters of the upper and lower passageway portions. While two bearings 116, 118 are provided, a single bearing 116 may be provided.

The drive gear 112 has an upper splined portion 130, which is generally cylindrical, a lower splined portion 132, which is generally cylindrical, separated by a cylindrical portion 134. The upper splined portion 130 and cylindrical portion 134 have a smaller diameter than the diameter of the lower splined portion 132 and seat within the passageway 122 of the swing mount housing 108. The lower splined portion 132 extends downward from a lower end of the swing mount housing 108. An outer race 136 of the upper bearing 116 is affixed to the inner surface of the wall forming the upper passageway portion of the passageway 122. An outer race 138 of the lower bearing 118 is affixed to the inner surface of the wall forming the lower passageway portion of the passageway 122, and an inner race 140 of the lower bearing 118 is affixed to the cylindrical portion 134 of the drive gear 112 and may be coupled together by intermeshing splines.

The teeth of the drive gear 112 are intermeshed with the teeth of the outer ring gear 18 of the post 16. The flange 124 of the end plate 114 is engaged against the inner cylindrical mount 20 of the post 16.

Figure 5:
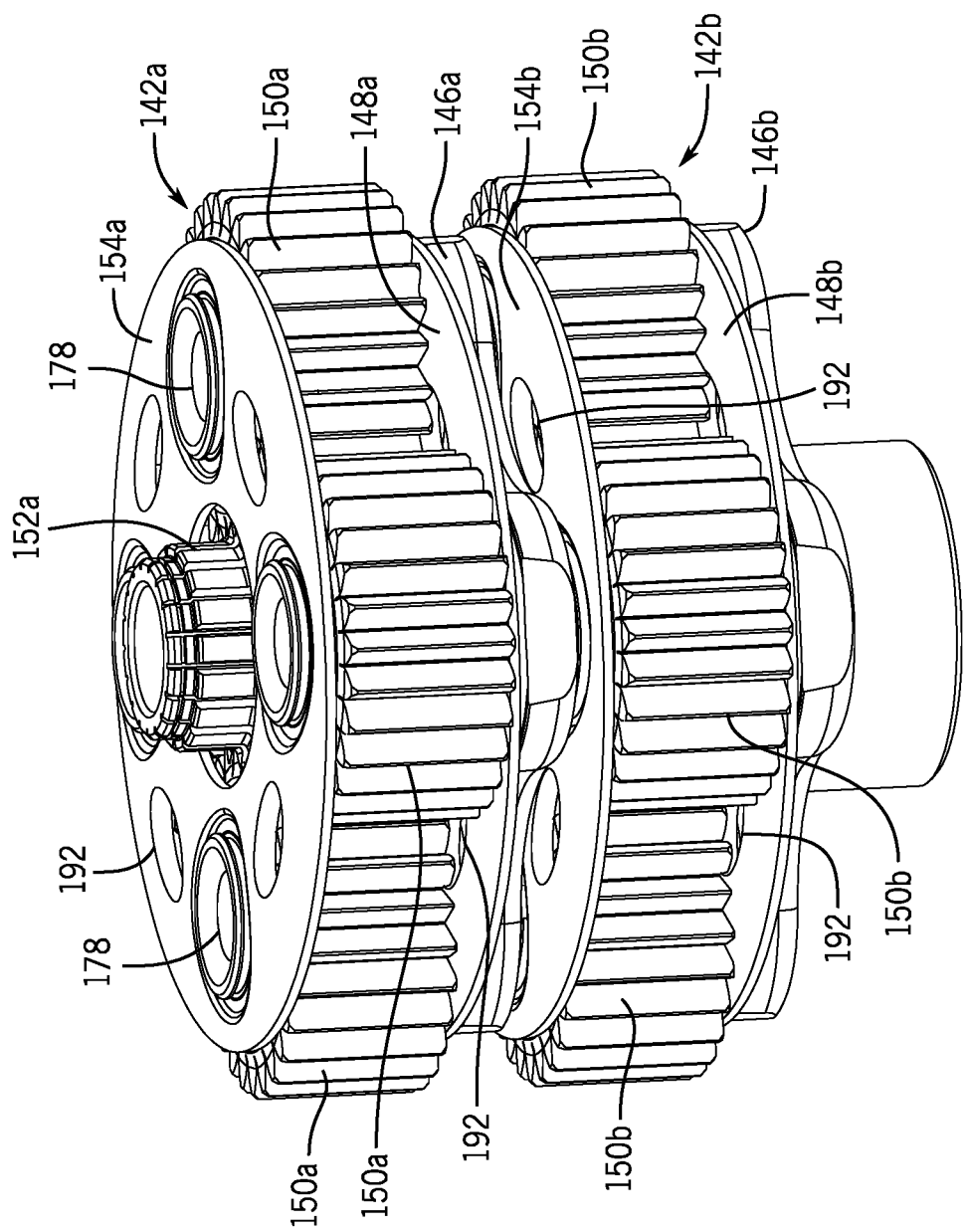
FIG. 5 is a top perspective view of the planetary sets of the swing drive.

As shown in FIG. 5, the gear train 104 includes at least one planetary set 142a, 142b mounted within a drive housing 144 which forms a ring gear. The planetary set 142a, 142b is disposed beneath the electric machine 102 coaxial with the drive axis. As shown, two planetary sets 142a, 142b are shown and described, however, a single planetary set may be provided or more than two planetary sets may be provided. Each planetary set 142a, 142b includes a carrier 146a, 146b, a lower splash plate 148a, 148b on top of the carrier 146a, 146b, planet gears 150a, 150b on top of the lower splash plate 148a, 148b, a sun gear 152a, 152b on top of the lower splash plate 148a, 148b and positioned within the planet gears 150a, 150b, and an upper splash plate 154a, 154b on top of the planet gears 150a, 150b. Teeth on the outer periphery of the planet gears 150a intermesh with the teeth on the outer periphery of the sun gear 152a and the teeth on the inner periphery of the drive housing 144. The teeth on the outer periphery of the planet gears 150b intermesh with the teeth on the outer periphery of the sun gear 152b and the teeth on the inner periphery of the drive housing 144. Each splash plate 148a, 148b, 154a, 154b has an outer diameter which is less than the internal diameter of the drive housing 144. While four planet gears are shown in each planetary set 142a, 142b, only three or more planet gears are required.

Figure 6:
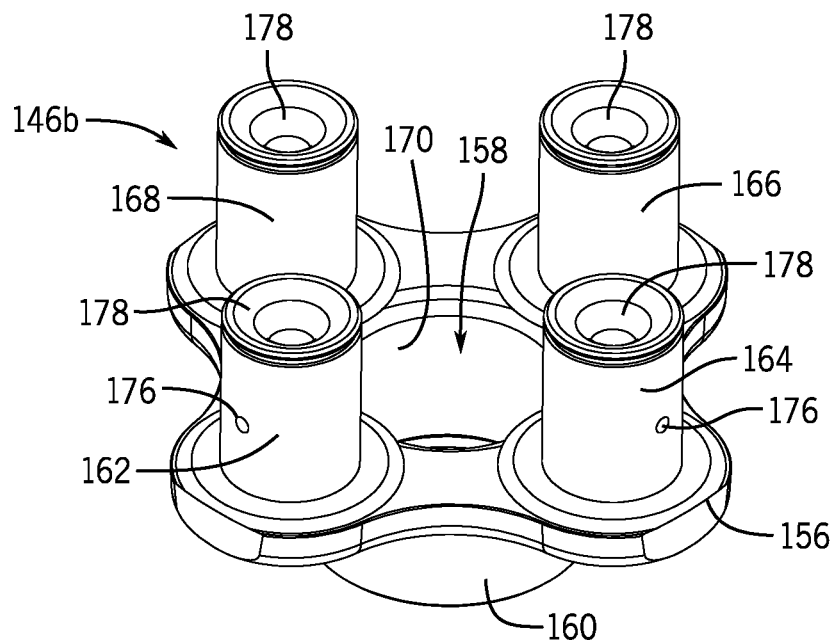
FIG. 6 is a top perspective view of a carrier of the swing drive.
Figure 7:
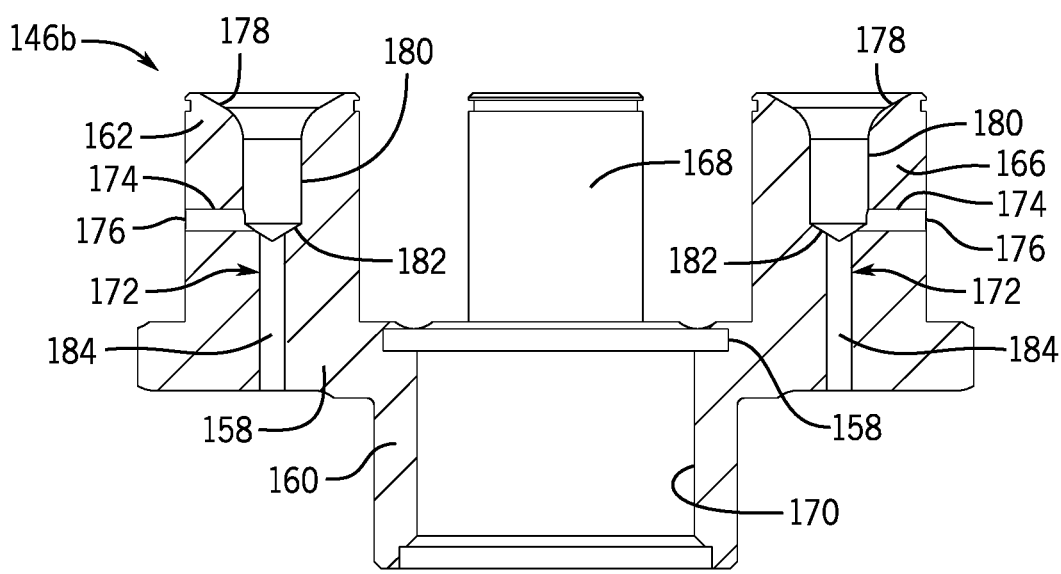
FIG. 7 is a cross-sectional view of the carrier of FIG. 6.

As shown in FIGS. 6 and 7, each carrier 146a, 146b has a generally circular planar base 156 having a central opening 158, a lower tubular projection 160 extending from a lower surface of the base 156 at the center thereof and surrounding the central opening 158, and four equidistantly spaced apart upper cylindrical pinion shafts 162, 164, 166, 168 extending from an upper surface of the base 156. Each base 156 has an outer diameter which is less than the internal diameter of the drive housing 144. The lower projection 160 has a central passageway 170 which aligns with the central opening 158. An open ended through passageway 172 extends from a top surface of each pinion shaft 162, 164, 166, 168 to a bottom surface of the base 156, and a passageway 174 extends from approximately the midpoint of the respective through passageway 172 to an exit 176 at a side surface of the pinion shaft 162, 164, 166, 168. In the embodiment as shown in FIGS. 4, 6 and 7, the passageways 172 extend axially, and the passageways 174 extend radially, and a central axis of the passageways 172 fall along an imaginary circle. As further shown in the embodiment of FIGS. 4, 6 and 7, the passageways 174 of opposed pinion shafts 162, 166 align with each other, and the passageways 174 of opposed pinion shafts 164, 168 align with each other.

In the embodiment as shown in FIG. 7, each through passageway 172 has an enlarged upper catch cup and a lower axially extending portion. As shown, the upper catch cup includes an upper passageway portion 178 which extends from the upper end of each pinion shaft 162, 164, 166, 168, to a vertical intermediate elongated cylindrical passageway portion 180 which has a diameter which is less than the diameter of the upper passageway portion 178 at its upper end, and to a generally tapered passageway portion 182. In other embodiments, each upper catch cup is generally tulip shaped or is formed by a continuously tapering wall such that a cone is formed. In the embodiment as shown in FIG. 7, the axially extending portion is a vertical lower elongated cylindrical passageway portion 184 which has a diameter which is less than the diameter of the intermediate passageway portion 180. The passageway 174 extends from a lower end of the respective intermediate passageway portion 180. The passageway portions 180, 184 may be cylindrical.

As shown in FIGS. 8 and 9, each splash plate 148a, 148b, 154a, 154b is formed of a circular plate 186 having a central opening 188, equidistantly spaced apart openings 190 extending from an upper surface thereof to a lower surface thereof surrounding the central opening 188, and at least one aperture 192 extending from an upper surface thereof to a lower surface thereof surrounding the central opening 188. As shown, four equidistantly spaced apertures 192 are provided. As shown, the openings 190 and the apertures 192 alternate with each other around the circumference of the plate 186. The plate 186 is generally dome-shaped. The plate 186 preferably has an arcuate cross-section as shown in FIG. 9 along all radial lines thereof. In an embodiment, the plate 186 is planar. An indentation 194 may surround each opening 190.

Figure 10:
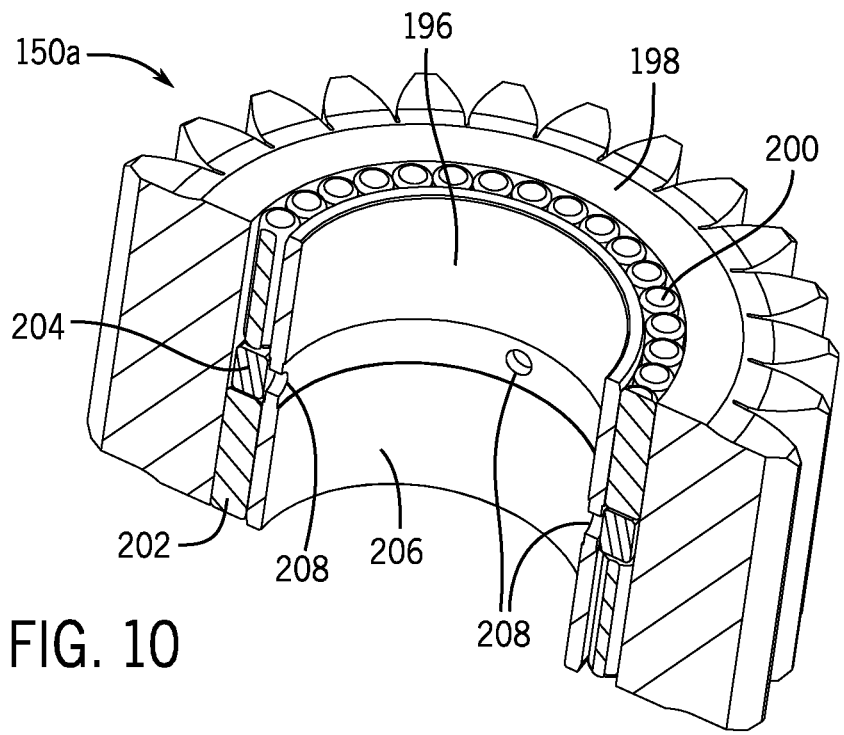
FIG. 10 is a cross-sectional view of a planet gear of the swing drive, shown in perspective.
Figure 11:
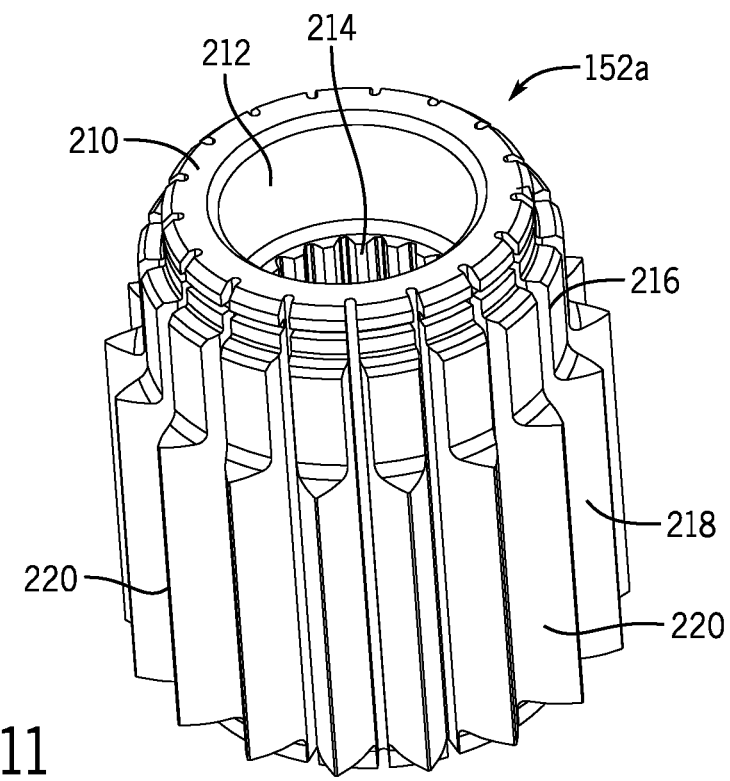
FIG. 11 is a top perspective view of a sun gear of the swing drive.
Figure 12:
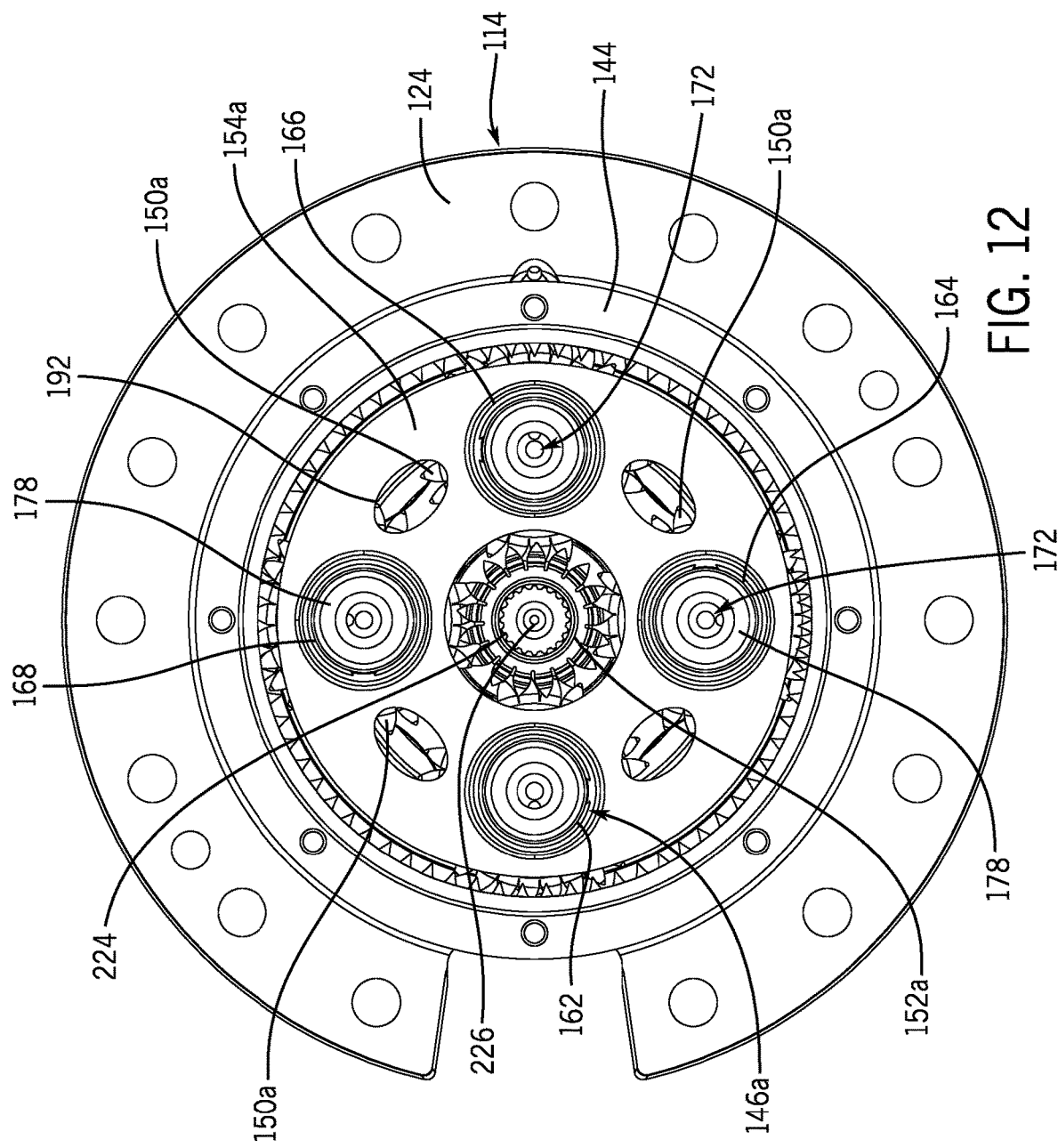
FIGS. 12-16 are cross-sectional views of the swing drive.
Figure 13:
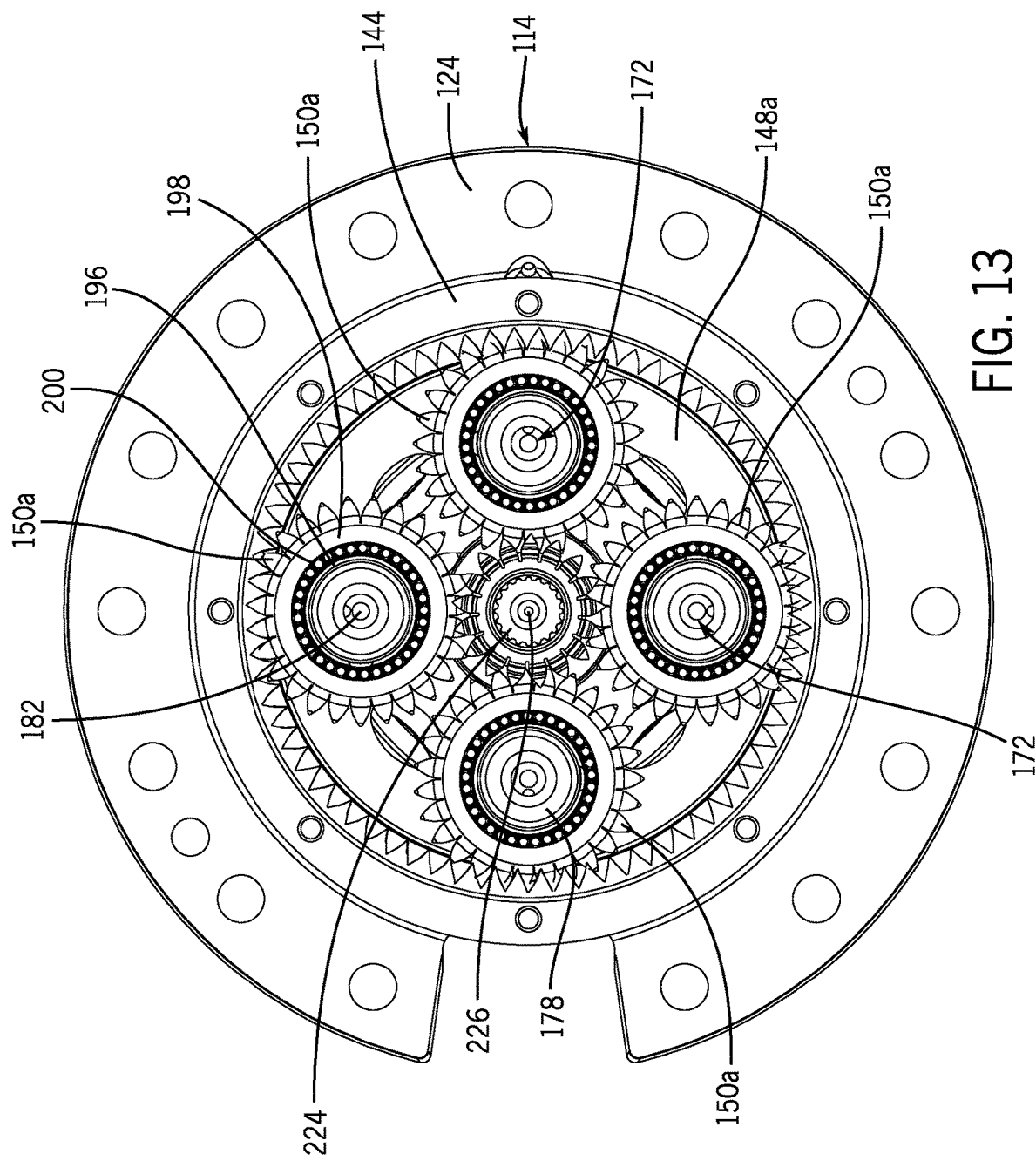
Figure 14:
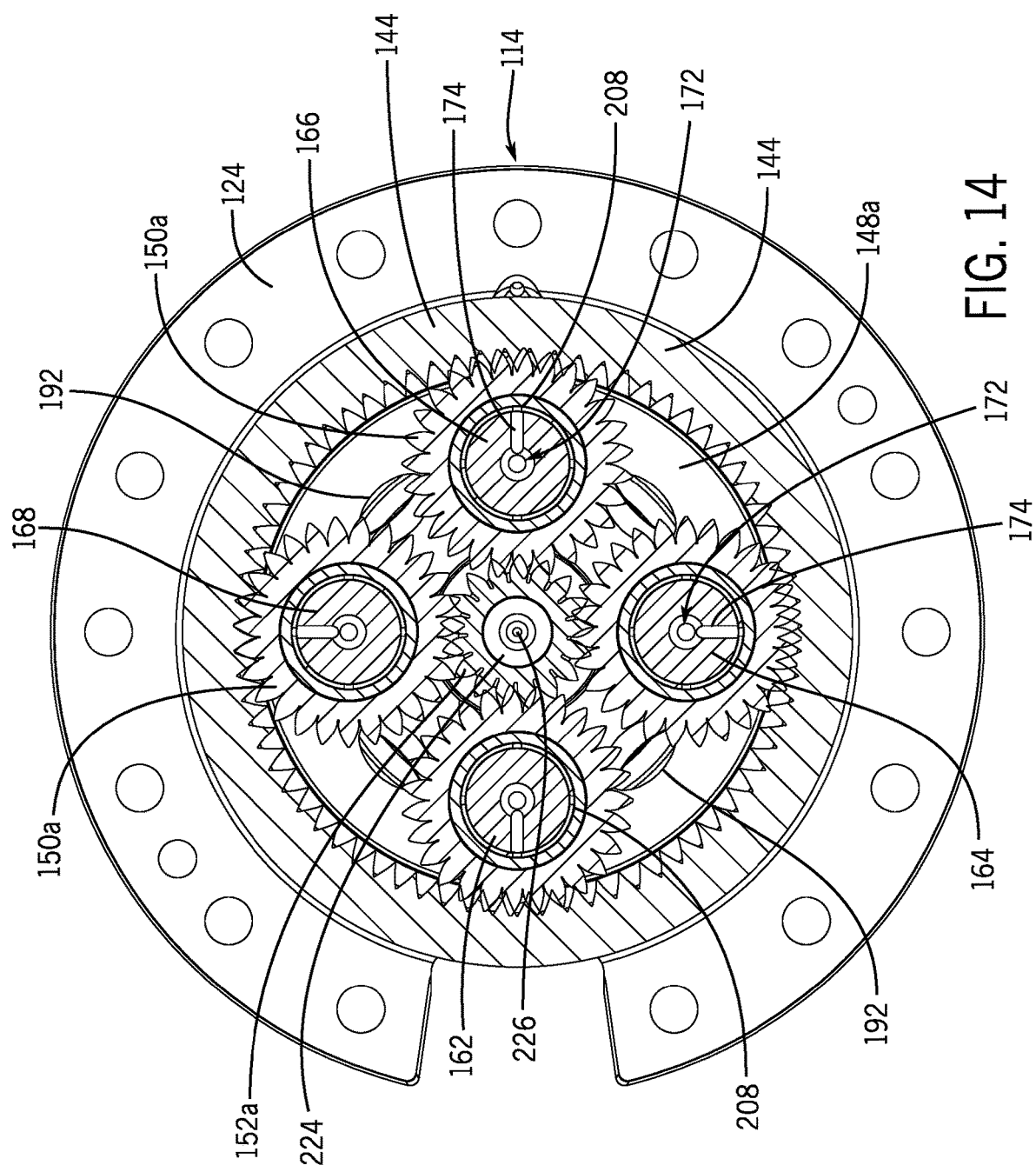
Figure 15:
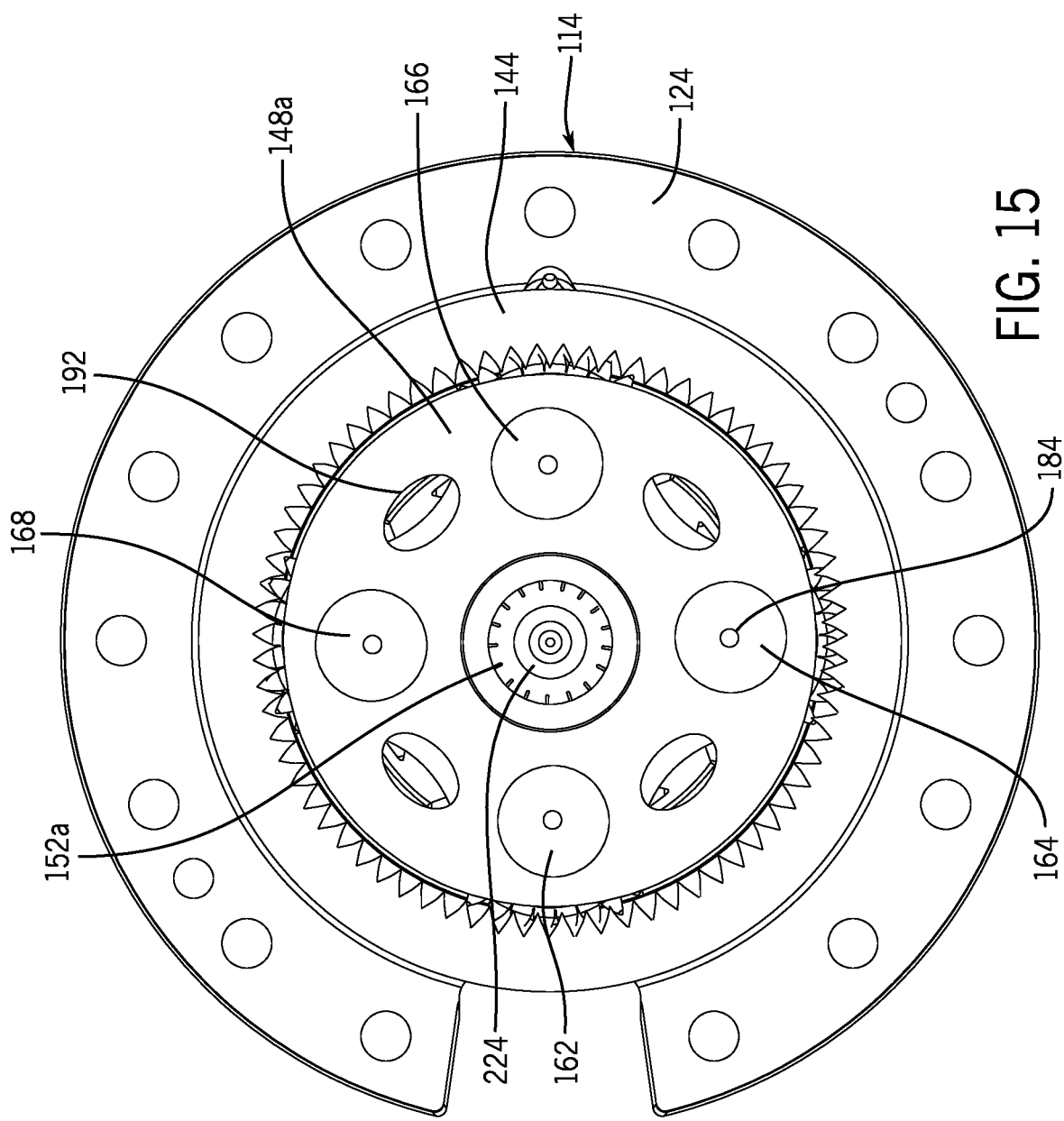
Figure 16:
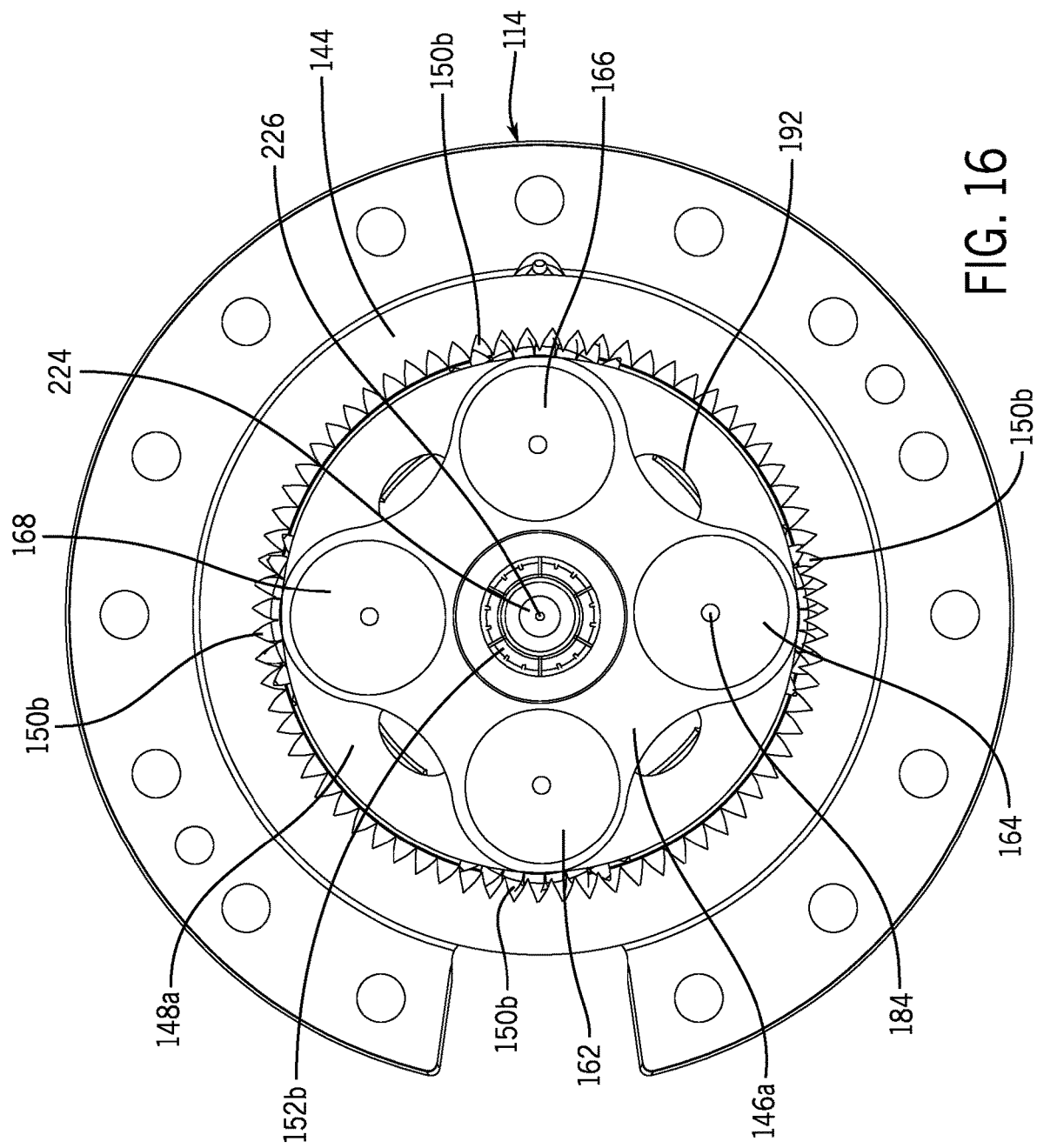

As shown in FIG. 10, each planet gear 150a, 150b has a tubular inner race 196 and a tubular outer race 198 coupled together by a plurality of upper roller bearings 200 and a plurality of lower roller bearings 202 which are separated from each other by a washer 204. The inner race 196 defines a central cylindrical passageway 206 from an upper end thereof to a lower end thereof. A plurality of spaced apart passageways 208 are provided in the inner race 196 and extend from the central passageway 206 to the washer 204. The outer race 198 has a plurality of teeth on its outer surface.

The pinion shafts 162, 164, 166, 168 of the carrier 146a, 146b extend through the openings 190 of the lower splash plate 148a, 148b. The respective planet gears 150a, 150b surround the respective pinion shafts 162, 164, 166, 168 of the carrier 146a, 146b and sit on the thrust splash plate 148a, 148b. The exit 176 of the passageway 174 of the respective pinion shafts 162, 164, 166, 168 vertically align with the through passageways 208 of the respective planet gear 150a, 150b. The pinion shafts 162, 164, 166, 168 further extend through the openings 190 of the upper splash plate 154a, 154b and extend outwardly from the upper splash plate 154a, 154b.

Each sun gear 152a, 152b has a wall 210 having a central passageway 212 extending from an upper end thereof to a lower end thereof. A portion 214 of the wall forming the central passageway 212 is splined. An upper portion 216 of the outer surface of the wall 210 has an outer cylindrical surface which has splines therein, and a lower portion 218 of the outer surface of the wall 210 has a plurality of teeth 220. The teeth 220 define an outer diameter which is greater than the outer diameter of the upper portion 216.

The sun gear 152a extends through the central opening 158 of the carrier 146a and the central opening 188 of the lower splash plate 148a, and extends between the planet gears 150a and the teeth 220 intermesh with the teeth of the planet gears 150a, and extends through the central opening 188 of the upper splash plate 154a. The sun gear 152a extends upwardly from the upper splash plate 154a. The teeth of the planet gears 150a intermesh with each other, intermesh with the teeth 220 of the sun gear 152a, and intermesh with the teeth of the drive housing 144. The sun gear 152b seats within the central opening 158 of the carrier 146b and the central opening 188 of the lower splash plate 148b, extends between the planet gears 150b and the teeth 220 intermesh with the teeth of the planet gears 150b, extends through the central opening 158 of the upper splash plate 154b, and through the central opening 158 of the upper carrier 146a. The sun gear 152b extends upwardly from the upper splash plate 154b. The teeth of the planet gears 150b intermesh with each other, intermesh with the teeth 220 of the sun gear 152b, and intermesh with the teeth of the drive housing 144.

The lower projection 160 of the carrier 146a has splines thereon which interengage with the splines on the upper portion 216 of the sun gear 152b and sits above the teeth 220 of the sun gear 152b. The base 156 of the carrier 146a is spaced from the upper ends of the pinion shafts 162, 164, 166, 168 of the carrier 146b.

The lower projection 160 of the carrier 146b extends into the upper passageway portion of the passageway 122 of the swing mount housing assembly 110 and is positioned between the upper splined portion 130 of the drive gear 112 and an inner race 222 of the upper bearing 116. The central passageway 170 of the lower projection 160 of the carrier 146b is splined and intermeshes with splines on the upper splined portion 130 of the drive gear 112. The inner race 222 of the upper bearing 116 is affixed to the outer surface of the lower projection 160 and may be coupled together by intermeshing splines.

A washer having a central opening is provided between the sun gears 152a, 152b. The washer is secured through grooves in the mating sun gears 152a, 152b and held in place with gravity.

A separator 224 is mounted within the portion 214 of the central passageway 212 of the sun gear 152b and has splines on an outer surface thereof which engage with the splines of the portion 214. The separator 224 has a central passageway 226 extending from an upper end thereof to a lower end thereof. An O-ring is provided between the separator 224 and the sun gear 152b.

In operation, when the output shaft 106 rotates, the splined coupling of the output shaft 106 and the sun gear 152a causes the sun gear 152a to co-rotate. The intermeshed teeth of the sun gear 152a and the planet gears 150a causes the planet gears 150a to rotate. The intermeshed teeth of the planet gears 150a and the drive housing 144 causes the carrier 146a and splash plates 148a, 154a to rotate relative to the drive housing 144. The splined coupling of the carrier 146a and the sun gear 152b causes the 152b to rotate. The intermeshed teeth of the sun gear 152b and the planet gears 150b causes the planet gears 150b to rotate. The intermeshed teeth of the planet gears 150b and the drive housing 144 causes the carrier 146b and splash plates 148b, 154b to rotate relative to the drive housing 144. The splined coupling of the carrier 146b and the drive gear 112 causes the drive gear 112 to rotate. The intermeshed teeth of the drive gear 112 and the outer ring gear 18 and the engagement of the circular flange 124 of the end plate 114 causes the swing drive 100 and the main frame 22 to rotate relative to the undercarriage 12.

The planetary sets 142a, 142b and drive housing 144 effect a gear ratio change to rotate the main frame 22 relative to the undercarriage 12 around the pivot axis 24. Other configurations of the planetary sets 142a, 142b may be incorporated without departing from the scope of the present disclosure. While two planetary sets 142a, 142b are shown and described, a single planetary set can be provided, or more than two planetary sets can be provided.

Oil flows from a face of the electric machine 102 under gravity into the gear train 104 and passes through the gear train 104 through a variety of flow paths to lubricate the bearings of the planet gears 150a, 150b and the bearing 116.

The lubricating oil flows under gravity fall from the face of the electric machine 102 and into the open enlarged upper passageway portions 178 of the carrier 146a, and through the intermediate passageway portions 180 and into the passageway portions 182. The shape of the passageways 172 promotes the entry of the oil into the passageways 172. The size of the passageways 172 meters the flow of lubricating oil therethrough. Some lubricating oil that is not captured within the passageways 172 spills onto the splash plate 154*a* and collects in the indentation 194, and then flows across the splash plate 154*a* and passes through the aperture(s) 192. The dome shape of the splash plate 154*a* assists in directing the flow of the lubricating oil. The lubricating oil flows through the aperture(s) 192 of the splash plate 154*a* and onto the teeth of the planet gears 150*b* to lubricate and then further flows as described below. Because of the rotation of the carrier 146*a*, centrifugal force causes fluid flow off of the splash plate 154*a*, around the carrier 146*a* and onto the teeth of the planet gears 150*b* and the drive housing 144 to lubricate and then further flows as described below.

Because of the rotation of the carrier 146*a*, centrifugal force causes fluid flow through the passageways 174. The planet gears 150*a* are rotating relative to the pinion shafts 162, 164, 166, 168. When the passageways 208 in the planet gears 150*a* align with the passageways 174 of the pinion shafts 162, 164, 166, 168, lubricating oil flows through the inner races 196 to the bearings 200, 202 to lubricate the bearings 200, 202. The lubricating oil then flows down through the lower ends of the planet gears 150*a* and onto the splash plate 148*a*. The lubricating oil then flows through the aperture(s) 192 of the splash plate 148*a*, through the aperture(s) 192 of the splash plate 154*b*, onto the teeth of the planet gears 150*b* which lubricates the intermeshing teeth of the planet gears 150*b*, through the aperture(s) 192 of the splash plate 148*b*, and around the carrier 146*b*. Some lubricating oil flows around the splash plates 148*a*, 154*b*, 148*b* and carriers 146*a*, 146*b*. Oil then flows through a port 228 in the end plate 114 that is in communication with an opening 230 in the outer race of the bearing 116 to allow lubricating oil to flow into and lubricate the bearing 116. The lubricating oil flows down out of the bottom of the bearing 116 to an exit port 232 of the end plate 114. The lubricating oil is then cooled and returned to the electric machine 102 for reuse.

Lubrication oil also flows through from the passageway portions 182 into the lower passageway portions 184 under gravity, and then into the open enlarged upper passageway portions 178 of the carrier 146*b*, through the intermediate passageway portions 180 of the carrier 146*b*, through the passageway portions 182 of the carrier 146*b*. The lubricating oil then flows through the aperture(s) 192 of the splash plate 154*b* and onto the teeth of the planet gears 150*b* and then further flows as described below. Like that of carrier 146*a*, any lubricating oil that is not captured within the passageways 172 spills onto the splash plate 154*b* and then ultimately flows to the exit port 232.

Because of the rotation of the carrier 146*b*, centrifugal force causes fluid flow through the passageways 174. The planet gears 150*b* are rotating relative to the pinion shafts 162, 164, 166, 168 of the carrier 146*b*. When the passageways 208 in the planet gears 150*b* align with the passageways 174 of the pinion shafts 162, 164, 166, 168 of the carrier 146*b*, lubricating oil flows through the inner races 196 to the bearings 200, 202 to lubricate the bearings 200, 202. The lubricating oil then flows down through the lower ends of the planet gears 150*b* and onto the splash plate 148*b*. The oil then flows through the aperture(s) 192 of the splash plate 148*b* and around the splash plate 148*b*, and around the carrier 146*b* to the exit port 232. Some lubricating oil flows around the splash plates 148*a* and carriers 146*b* to the exit port 232.

Oil also flows through from the passageway portions 182 of the carrier 146*b* into the lower passageway portions 184 of the carrier 146*b*, and out the lower end of the base 156 of the carrier 146*b* to the exit port 232.

Oil is also received from a passageway 234 through the output shaft 106. Oil flows from the passageway 234 into the passageway 212 of the sun gear 152*a*, into the passageway 226 of the separator 224, and then into the passageway 212 of the sun gear 152*b*. The oil seeps through the interface between the upper splined portion 130 of the drive gear 112 and the lower tubular projection 160 of the carrier 146*b*, which then flows to the exit port 232.

The lubricating oil also drips down between the components of the swing drive 100 until captured at the exit port 232.

The bearing 118 may be supplied with a separate port 236 which is in communication with an opening in the outer race of the bearing 118 to allow lubricating oil to flow into and lubricate the bearing 118.

Figure 17:
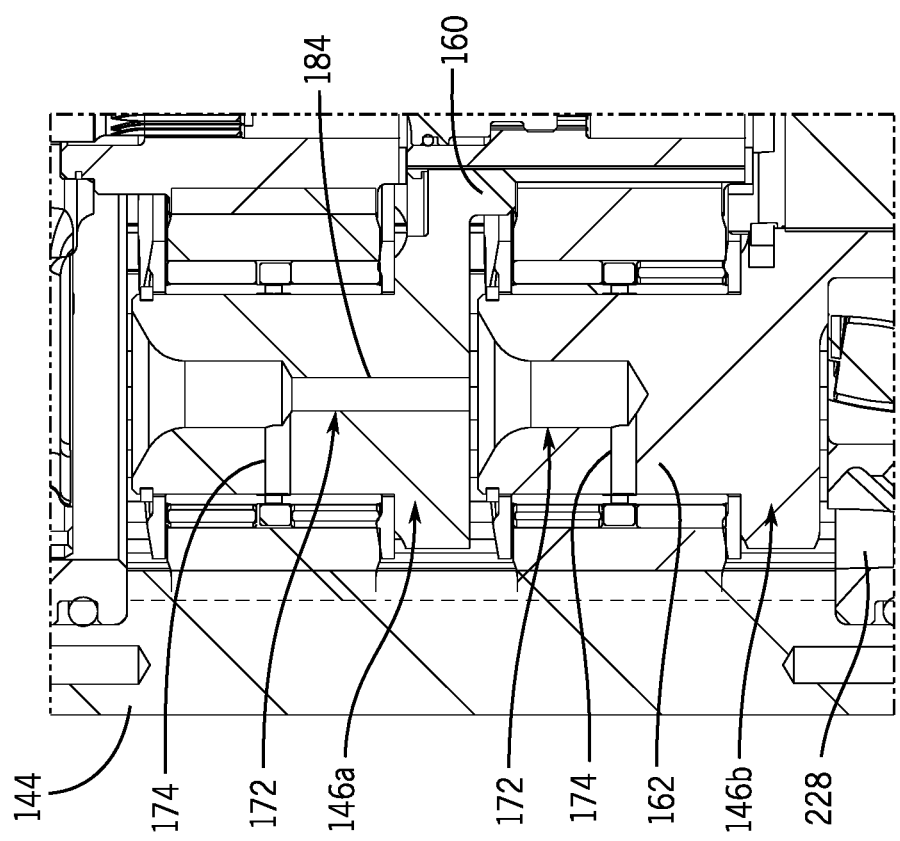

In an embodiment as shown in FIG. 17, the lower passageway portions 184 of the carrier 146*b* are eliminated and all of the lubricating oil flowing through the passageways 172 flows through the passageways 174.

Figure 18:
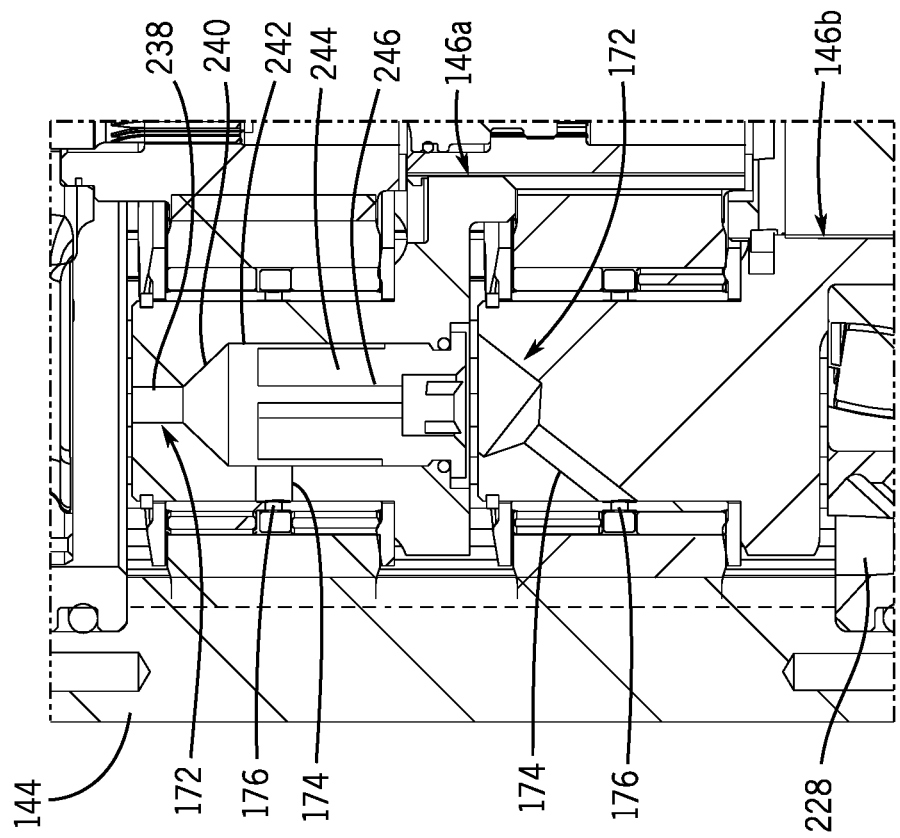
FIGS. 17 and 18 are partial cross-sectional views of the swing drive.

In an embodiment as shown in FIG. 18, the passageway 172 shown in carrier 146*a* is a through passageway 172 extending from the top of the pinion shaft 162, 164, 166, 168 to the bottom thereof. The passageway 172 has an inverted enlarged upper catch cup and a lower axially extending portion. As shown, the upper catch cup includes an axially extending upper passageway portion 238 which extends from the upper end of each pinion shaft 162, 164, 166, 168, to a generally tapered passageway portion 240, and to an axially extending lower passageway portion 242 which extends from the lower end of each pinion shaft 162, 164, 166, 168. The upper passageway portion 238 has a diameter which is less the diameter of the lower passageway portion 242. In another embodiment, each upper catch cup is formed by a continuously tapering wall such that a cone is formed. An insert 244 is provided in the lower passageway portion 242 to form the lower axially extending portion 246. The passageway portions 238, 240, 246 may be cylindrical. This same passageway 172 can be provided in the lower carrier 146*b* with the outlet of the lower passageway portion 242 of carrier 146*b* aligning with the upper passageway portion 238 of carrier 146*a*.

As also shown in the embodiment of FIG. 18, the passageway 172 is not a through passageway 172 which extends from the top of the pinion shaft 162, 164, 166, 168 to the bottom thereof, and instead extends from the top of the pinion shaft 162, 164, 166, 168 and at an angle relative to the axial axis of the pinion shaft 162, 164, 166, 168 to the passageway 174. The passageway 174 also extends at that same angle from the exit of the passageway 172 to the exit 176 at the side surface of the pinion shaft 162, 164, 166, 168. The passageway 172 is formed as a catch cup as described herein. The passageway 172 may be cylindrical.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A swing drive for a rotating a component of a work vehicle comprising:
    an electric machine rotating an output shaft about a drive axis;
    a planetary set disposed beneath the electric machine coaxial with the drive axis and having a carrier with pinion shafts having oil passageways therethrough;
    a splash plate disposed axially between the electric machine and the planetary set, wherein the splash plate is configured to direct lubricating oil from a face of the electric machine to the oil passageways of the pinion shafts in order to lubricate an area of the planetary set and to direct lubricating oil from the face of the electric machine away from the oil passageways to lubricate another area the planetary set;
    and a drive gear driven about the drive axis by the electric machine via the planetary set.

2. The swing drive of claim 1, wherein each oil passageway includes a first passageway which extends from a top of the associated pinion shaft to a bottom of the associated pinion shaft, and a second passageway extending from the first passageway to a side of the associated pinion shaft.

3. The swing drive of claim 2, wherein each first passageway defines a catch cup and a lower passageway, the catch cup having an enlarged diameter relative to the lower passageway.

4. The swing drive of claim 1, wherein the planetary set defines a first planetary set, the carrier defines a first carrier, and the splash plate defines a first splash plate; and
    further comprising:
    a second planetary set disposed beneath the first carrier;
    the second planetary set being coaxial with the drive axis and having a second carrier with second pinion shafts having second oil passageways therethrough;
    a second splash plate disposed axially below the first carrier, wherein the second splash plate is configured to direct lubricating oil to the second oil passageways and to direct lubricating oil around the second oil passageways; and
    wherein the drive gear is further driven about the drive axis via the second planetary set.

5. The swing drive of claim 4, wherein each oil passageway includes a first passageway which extends from a top of the associated pinion shaft to a bottom of the associated pinion shaft, and a second passageway extending from the first passageway to a side of the associated pinion shaft.

6. The swing drive of claim 5, wherein each first passageway defines a catch cup and a lower passageway, the catch cup having an enlarged diameter relative to the lower passageway.

7. The swing drive of claim 4, wherein each oil passageway of the first carrier includes a first passageway which extends from a top of the associated pinion shaft to a bottom of the associated pinion shaft, and a second passageway extending from the first passageway to a side of the associated pinion shaft, and each oil passageway of the second carrier includes a first passageway which extends from a top of the associated pinion shaft to a second passageway which extends to a side of the associated pinion shaft.

8. The swing drive of claim 7, wherein each first passageway of the first carrier defines a catch cup and a lower passageway, the catch cup having an enlarged diameter relative to the lower passageway.

9. The swing drive of claim 4, wherein each oil passageway of the first carrier includes an axial passageway extending axially through the associated pinion shaft and a passageway extending at an angle from the axial passageway through the associated pinion shaft, and each oil passageway of the second carrier includes a passageway extending at an angle through the associated pinion shaft.

10. The swing drive of claim 4, wherein power is transmitted from the output shaft of the electric machine to the drive gear via input to a first sun gear of the first planetary set, output from the first carrier to a second sun gear of the second planetary set, and output from a second carrier of the second planetary set to the drive gear.

11. The swing drive of claim 1, further including a drive housing in which the planetary set is disposed, the drive housing including an end plate through which the drive gear extends.

12. The swing drive of claim 11, further including a first bearing supporting the carrier for rotation relative to the end plate of the drive housing, wherein the first bearing receives lubricating oil from the planetary set; and
    a second bearing disposed to an exterior side of the end plate opposite the first bearing, the second bearing receiving lubricating oil from the first bearing.

13. The swing drive of claim 1, wherein the splash plate is dome shaped with an arcuate cross-section along all radial lines thereof.

14. The swing drive of claim 13, wherein the splash plate includes at least one aperture therethrough which directs lubricating oil from the face of the electric machine around the oil passageways.

15. The swing drive of claim 1, wherein the splash plate includes at least one aperture therethrough which directs lubricating oil from the face of the electric machine around the oil passageways.

16. The swing drive of claim 1, further including a separator disposed within an annular splined shaft meshing with a sun gear of the planetary set and including a splash surface configured to direct a portion of lubricating oil passing around the output shaft of the electric machine to the planetary set and a metering passageway directing a portion of the lubricating oil passing around the output shaft to the drive gear.

17. A work vehicle comprising:
    a work vehicle component in the form of a work implement or an operator cab; and
    a swing drive for a rotating the work vehicle component, the swing drive including:
    an electric machine rotating an output shaft about a drive axis;
    a planetary set disposed beneath the electric machine coaxial with the drive axis and having a carrier with pinion shafts having oil passageways therethrough;
    a splash plate disposed axially between the electric machine and the planetary set, wherein the splash plate is configured to direct lubricating oil from a face of the electric machine to the oil passageways of the pinion shafts in order to lubricate an area of the planetary set and to direct lubricating oil from the face of the electric machine away from the oil passageways to lubricate another area the planetary set; and a drive gear driven about the drive axis by the electric machine via the planetary set.

18. The work vehicle of claim 17, wherein the swing drive rotates the work vehicle component more than 360 degrees.

19. The work vehicle of claim 17, wherein each oil passageway includes a catch cup and a lower passageway extending therefrom, the catch cup having an enlarged diameter relative to the lower passageway.

20. The work vehicle of claim 17, wherein the splash plate is dome shaped with an arcuate cross-section along all radial lines thereof and includes at least one aperture therethrough which directs lubricating oil from the face of the electric machine around the oil passageways.

* * * * *